US009084252B2

(12) United States Patent
Chen et al.

(10) Patent No.: US 9,084,252 B2
(45) Date of Patent: Jul. 14, 2015

(54) PROCESSING ENHANCED PDCCH (EPDCCH) IN LTE

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 116 days.

(21) Appl. No.: 13/723,089

(22) Filed: Dec. 20, 2012

(65) Prior Publication Data
US 2013/0170449 A1 Jul. 4, 2013

Related U.S. Application Data

(60) Provisional application No. 61/581,487, filed on Dec. 29, 2011, provisional application No. 61/707,705, filed on Sep. 28, 2012.

(51) Int. Cl.
H04W 72/04 (2009.01)
H04W 88/08 (2009.01)
H04W 72/08 (2009.01)
H04L 1/00 (2006.01)
H04L 5/00 (2006.01)
H04L 25/03 (2006.01)

(52) U.S. Cl.
CPC .......... H04W 72/042 (2013.01); H04L 1/0038 (2013.01); H04L 25/03866 (2013.01); H04W 72/044 (2013.01); H04L 5/0044 (2013.01); H04L 5/0053 (2013.01); H04W 72/082 (2013.01); H04W 88/085 (2013.01)

(58) Field of Classification Search
USPC ......... 370/329, 252, 328, 330, 280, 336, 277, 370/278, 311, 312, 332, 270; 455/450, 455/452.2
See application file for complete search history.

(56) References Cited

U.S. PATENT DOCUMENTS

| 8,923,905 | B2 * | 12/2014 | Montojo et al. ............... 455/507 |
| 2011/0038310 | A1 | 2/2011 | Chmiel et al. |
| 2011/0075624 | A1 | 3/2011 | Papasakellariou et al. |
| 2011/0170496 | A1 | 7/2011 | Fong et al. |
| 2011/0249633 | A1 * | 10/2011 | Hong et al. ................... 370/329 |

(Continued)

FOREIGN PATENT DOCUMENTS

| WO | 2012094608 A2 | 7/2012 |
| WO | 2012110831 A1 | 8/2012 |

OTHER PUBLICATIONS

International Search Report and Written Opinion—PCT/US2012/071359—ISA/EPO—Mar. 26, 2013.

(Continued)

Primary Examiner — Benjamin H Elliott, IV
Assistant Examiner — Eric Nowlin
(74) Attorney, Agent, or Firm — Seyfarth Shaw LLP

(57) ABSTRACT

A method of wireless communication includes configuring a virtual cell identifier (ID) for a user equipment (UE). The method determines a first candidate for an enhanced physical downlink control channel (ePDCCH) for the UE. The method also determines a first virtual cell ID for the first candidate. Furthermore, the method scrambles the ePDCCH based on the first virtual cell ID and transmits, to the UE, the scrambled ePDCCH using the first candidate.

52 Claims, 7 Drawing Sheets

(56) References Cited

U.S. PATENT DOCUMENTS

| | | | |
|---|---|---|---|
| 2011/0274066 A1* | 11/2011 | Tee et al. | 370/329 |
| 2011/0310829 A1 | 12/2011 | Ji et al. | |
| 2012/0106465 A1* | 5/2012 | Haghighat et al. | 370/329 |
| 2012/0176884 A1 | 7/2012 | Zhang et al. | |
| 2013/0039284 A1* | 2/2013 | Marinier et al. | 370/329 |
| 2013/0044692 A1* | 2/2013 | Nory et al. | 370/329 |
| 2013/0286997 A1* | 10/2013 | Davydov et al. | 370/329 |
| 2014/0044070 A1* | 2/2014 | Chen et al. | 370/329 |

OTHER PUBLICATIONS

NTT DOCOMO: "Mapping Design for E-PDCCH in Rel-11," 3GPP Draft; R1-114081 Mapping for E-PDCCH, 3rd Generation Partnership Project(#gPP), Mobile Competence Centre; 650, Route Des Lucioles; F-06921 Sophia-Antipolis Cedex; France; vol. RAN WG1, no. San Francisco , USA; 20111114-20111118, Nov. 9, 2011, XP050562297, [retrieved on Nov. 9, 2011].

Taiwan Search Report—TW101150968—TIPO—Dec. 16, 2014.

* cited by examiner

PROCESSING ENHANCED PDCCH (EPDCCH) IN LTE

CROSS-REFERENCE TO RELATED APPLICATION

This application claims the benefit under 35 U.S.C. §119(e) to U.S. Provisional Patent Application No. 61/581,487 entitled "PROCESSING ENHANCED PDCCH (EPDCCH) IN LTE," filed on Dec. 29, 2011, and Provisional Patent Application No. 61/707,705 entitled "PROCESSING ENHANCED PDCCH (EPDCCH) IN LTE," filed on Sep. 28, 2012, the disclosures of which are expressly incorporated by reference herein in their entireties.

BACKGROUND

1. Field

Aspects of the present disclosure relate generally to wireless communication systems, and more particularly to processing enhanced PDCCH (ePDCCH) based on a virtual cell ID.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to an aspect of the present disclosure, a method of wireless communication includes configuring at least one virtual cell identifier (ID) for a user equipment (UE). The method also includes determining a first candidate for an enhanced physical downlink control channel (ePDCCH) for the UE. The method further includes determining a first virtual cell ID for the first candidate. The method still further includes scrambling the ePDCCH based on the first virtual cell ID. The method also includes transmitting, to the UE, the scrambled ePDCCH using the first candidate.

According to another aspect of the present disclosure, a method of wireless communication is presented. The method includes determining a first set of decoding candidates for an enhanced physical downlink control channel (ePDCCH). The method also includes determining a first virtual cell identifier (ID) for the first set of decoding candidates. The method further includes decoding the ePDCCH based at least in part on the first virtual cell ID and the determined first set of decoding candidates.

According to yet another configuration, an apparatus for wireless communications is presented. The apparatus includes a means for configuring at least one virtual cell identifier (ID) for a user equipment (UE). The apparatus also includes a means for determining a first candidate for an enhanced physical downlink control channel (ePDCCH) for the UE. The apparatus further includes a means for determining a first virtual cell ID for the first candidate. The apparatus still further includes a means for scrambling the ePDCCH based on the first virtual cell ID. The apparatus also includes a means for transmitting, to the UE, the scrambled ePDCCH using the first candidate.

According to another configuration, an apparatus for wireless communications is presented. The apparatus includes a means for determining a first set of decoding candidates for an enhanced physical downlink control channel (ePDCCH). The apparatus also includes a means for determining a first virtual cell identifier (ID) for the first set of candidates. The apparatus further includes a means for decoding the ePDCCH based at least in part on the first virtual cell ID and the determined first set of decoding candidates.

According to yet another configuration, a computer program product for wireless communications is presented. The computer program product includes a non-transitory computer-readable medium having program code recorded thereon. The program code includes program code to configure at least one virtual cell identifier (ID) for a user equipment (UE). The program code also includes program code to determine a first candidate for an enhanced physical downlink control channel (ePDCCH) for the UE. The program code further includes program code to determine a first virtual cell ID for the first candidate. The program code still further includes program code to scramble the ePDCCH based on the first virtual cell ID. The program code also includes program code to transmit, to the UE, the scrambled ePDCCH using the first candidate.

According to still yet another configuration, a computer program product for wireless communications is presented. The computer program product includes a non-transitory computer-readable medium having program code recorded thereon. The program code includes program code to determine a first set of decoding candidates for an enhanced physical downlink control channel (ePDCCH). The program code also includes program code to determine a first virtual cell identifier (ID) for the first set of decoding candidates. The program code further includes program code to decode the ePDCCH based at least in part on the first virtual cell ID and the determined first set of decoding candidates.

According to another configuration, an apparatus for wireless communications is presented. The program code includes a memory and a processor(s) coupled to the memory. The processor(s) is configured to configure at least one virtual cell identifier (ID) for a user equipment (UE). The processor(s) is also configured to determine a first candidate for an enhanced physical downlink control channel (ePDCCH) for the UE. The processor(s) is further configured to determine a first virtual cell ID for the first candidate. The processor(s) is still further configured to scramble the ePDCCH based on the first virtual cell ID. The processor(s) is also configured to transmit, to the UE, the scrambled ePDCCH using the first candidate.

According to another configuration, an apparatus for wireless communications is presented. The program code includes a memory and a processor(s) coupled to the memory. The processor(s) is configured to determine a first set of decoding candidates for an enhanced physical downlink control channel (ePDCCH). The processor(s) is also configured to determine a first virtual cell identifier (ID) for the first set of decoding candidates. The processor(s) is further configured to decode the ePDCCH based at least in part on the first virtual cell ID and the determined first set of decoding candidates.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
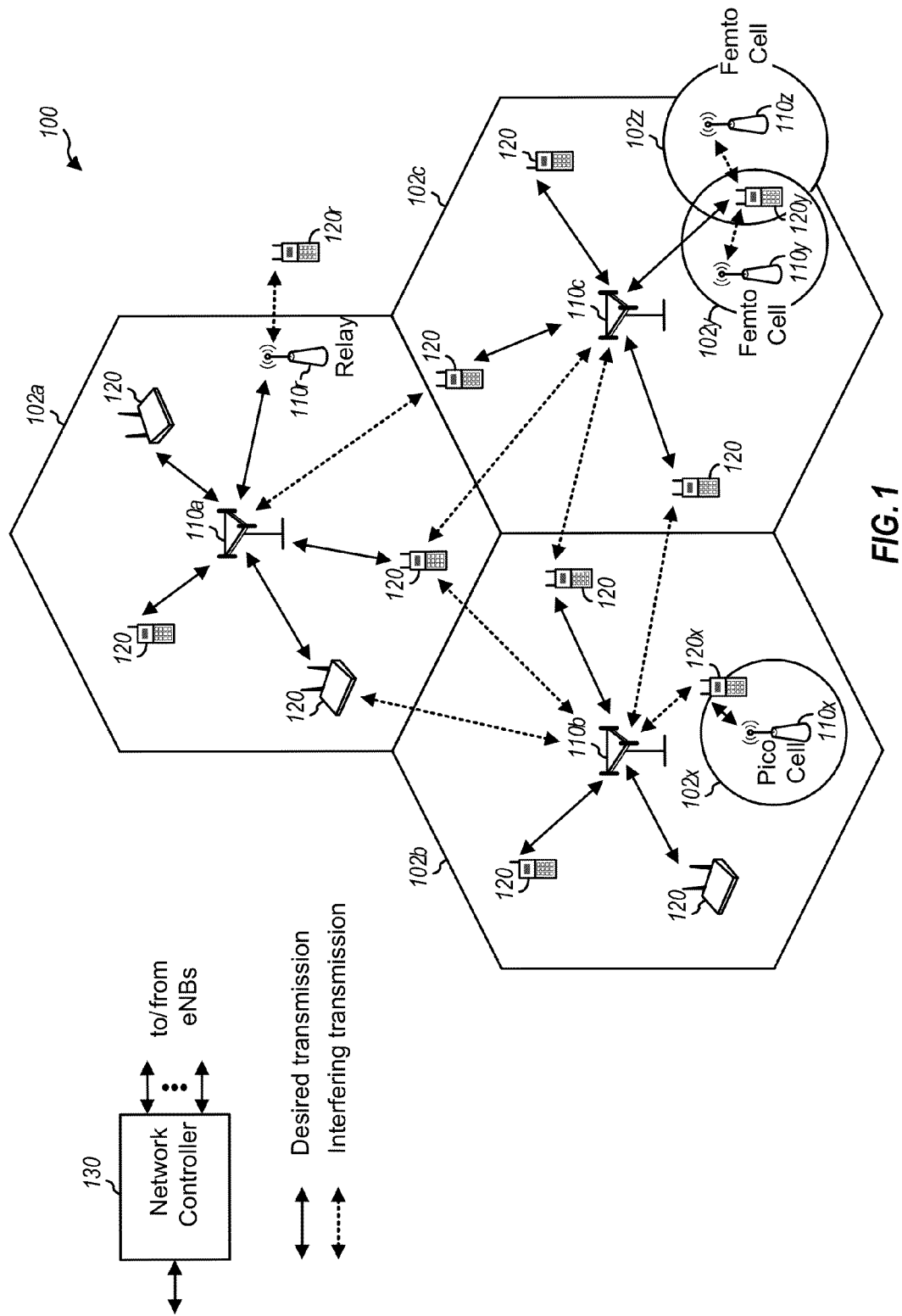
FIG. 1 is a block diagram conceptually illustrating an example of a telecommunications system.

FIG. 1 shows a wireless communication network 100, which may be an LTE-A network, configured to process ePDCCH. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, since ePDCCH and PDSCH are sent from the same cell, they are aligned in time. If the CRS is coming from a different cell with different timing offset a procedure using CRS relies on the other cell's timing (e.g. through a second FFT). The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
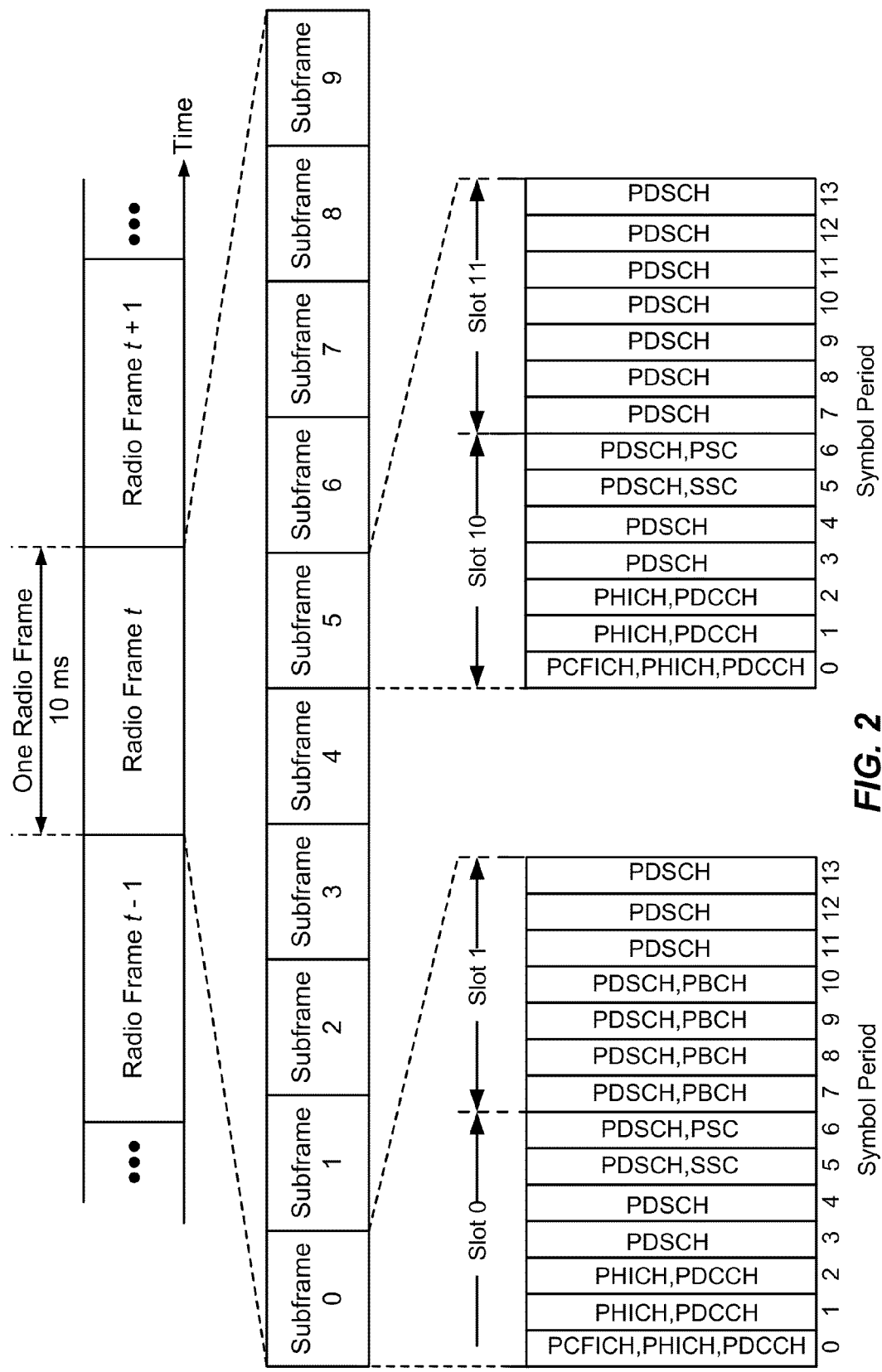
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
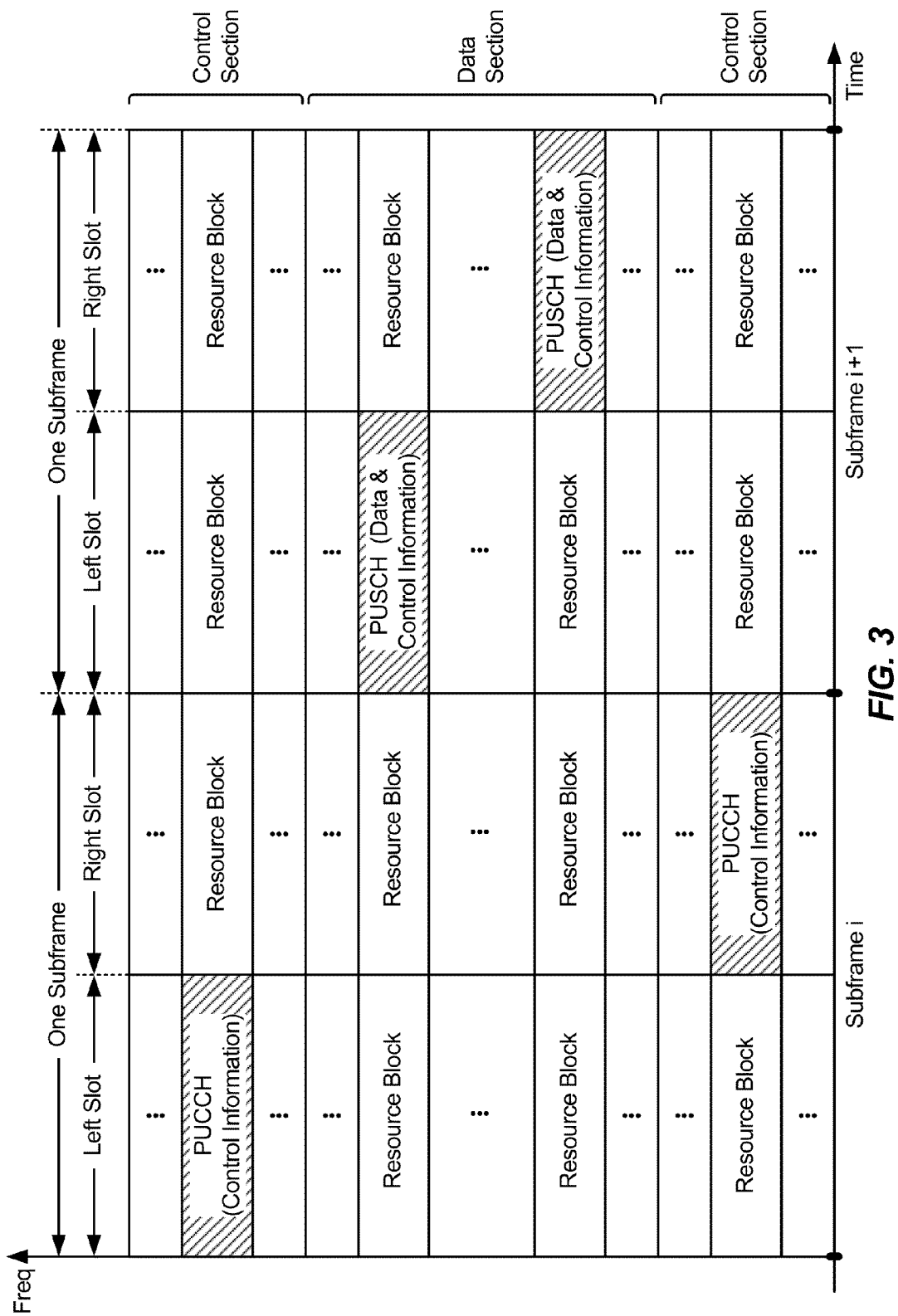
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
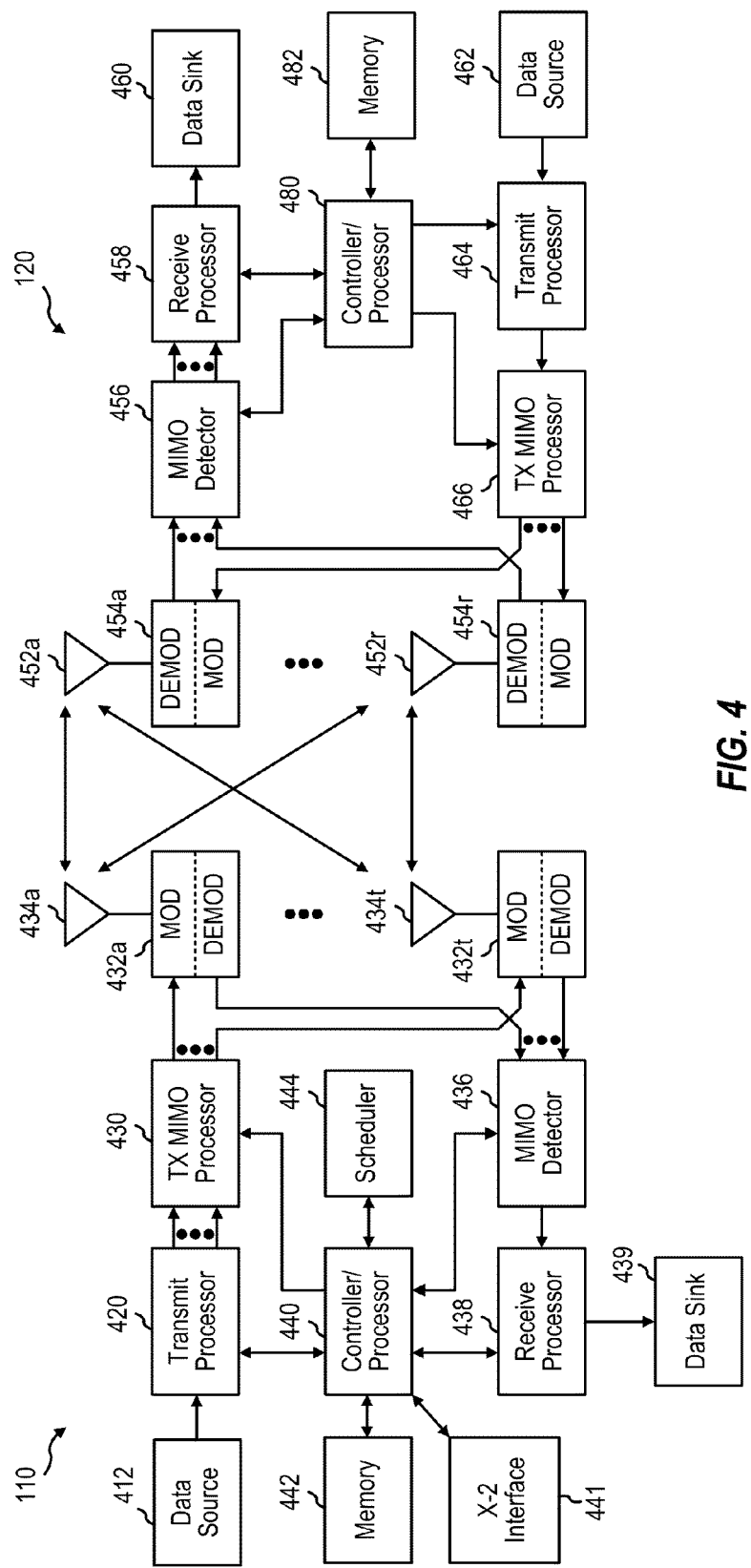
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440/480 and/or other processors and modules at the base station 110/UE 120 may perform or direct the execution of the functional blocks illustrated in method flow chart FIG. 6, and/or other processes for the techniques described herein. The memories 442 and 482 may store data and program codes for the base station 110 and the UE 120, respectively. A scheduler 444 may schedule UEs for data transmission on the downlink and/or uplink.

Cell switching for enhanced PDCCH (ePDCCH) in LTE

In LTE Release-8/9/10, a control channel, such as the physical download control channel (PDCCH), is located in the first several symbols in a subframe and is distributed in the entire system bandwidth. The control channel, such as the PDCCH, is time division multiplexed with a shared channel, such as a physical downlink shared channel (PDSCH), to divide a subframe into a control region and a data region.

LTE Release 11 (Rel-11) includes an enhanced physical download control channel (ePDCCH), which is configured to occupy the data region. That is, an enhanced control channel, such as ePDCCH, is frequency division multiplexed with the shared channel so the enhanced control channel occupies the data region of a subframe. In some configurations, the enhanced control channel may also be configured to increase control channel capacity, support frequency-domain interference coordination and cancellation (ICIC), achieve improved spatial reuse of control channel resource(s), support beam forming and/or diversity, operate on a new carrier type and in MBSFN subframes, and/or coexist on the same carrier as legacy UEs.

In Release 11, coordinated multipoint transmission (CoMP) schemes are supported. CoMP schemes provide an interference mitigation technique for improving overall communication performance. That is, with CoMP, multiple base stations, such as eNodeBs, collaborate to transmit data on the downlink to one or more UEs. Furthermore, with CoMP, multiple base stations may receive on the uplink from one or more UEs. Downlink CoMP and uplink CoMP can be separately or jointly enabled for a UE.

In one CoMP configuration, for downlink CoMP, multiple eNodeBs may transmit the same data meant for a specific UE. In another CoMP configuration, for uplink CoMP, multiple eNodeBs receive the same data from a specific UE. In yet another CoMP configuration, for coordinated beam forming, an eNodeB transmits to served UEs using beams that are chosen to reduce interference to UEs in neighboring cells. In still another CoMP configuration, for dynamic point(s) selection, the cell(s) involved in data transmissions may change from subframe to subframe. CoMP may exist in homogeneous networks and/or heterogeneous networks (HetNet). The connection between the nodes involved in CoMP can be X2, fiber, or another interface. In heterogeneous network CoMP, low power nodes may include remote radio heads (RRH).

Figure 5:
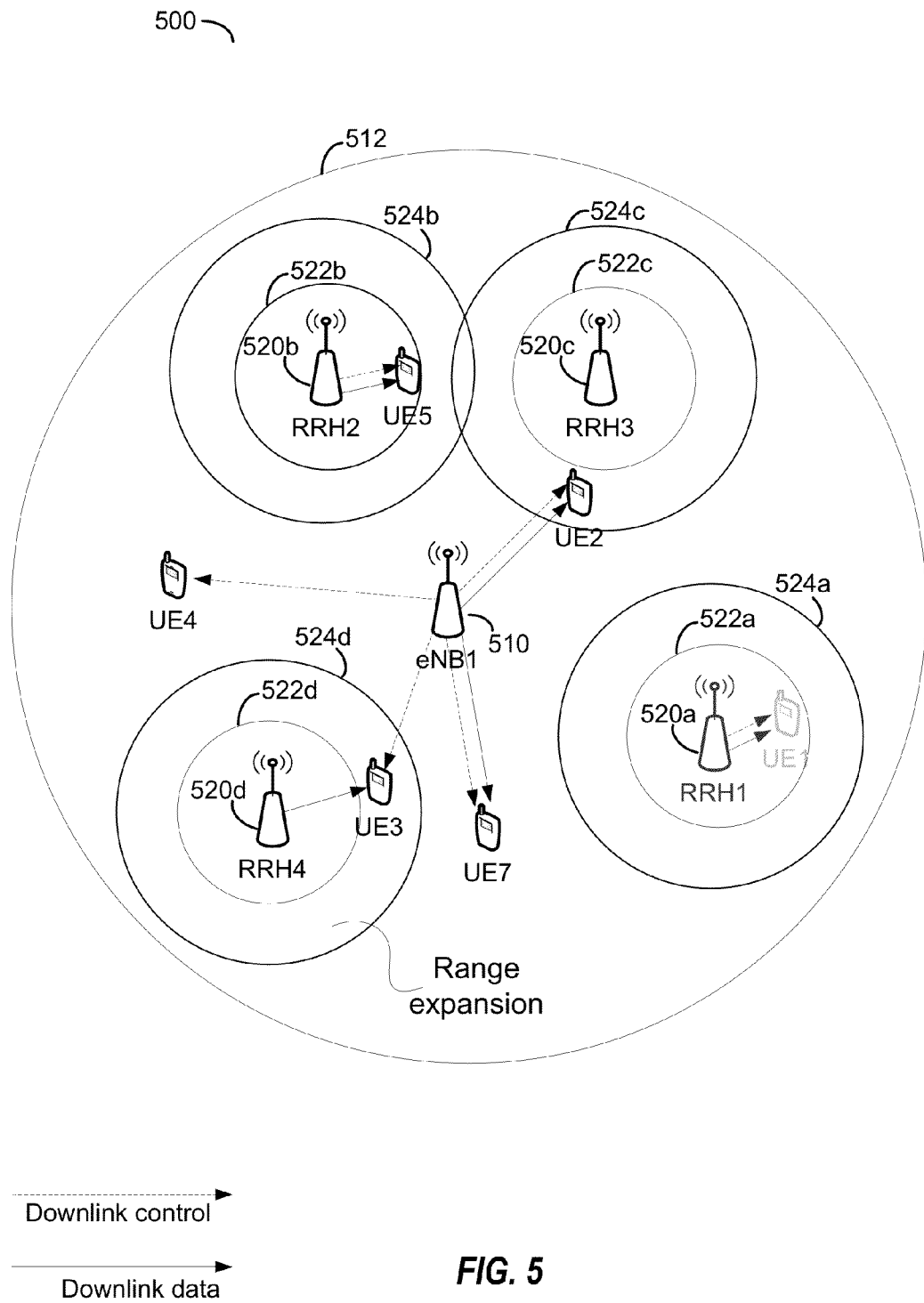
FIG. 5 is a block diagram conceptually illustrating a network including remote radio heads.

FIG. 5 illustrates a network 500 that includes a macro base station 510, such as an eNodeB, having a coverage area defined by a cell 512. The network also includes remote radio heads 520a-520d with coverage areas defined by respective cells 522a-522d. UEs (UE1-UE7) communicate with the various eNBs/RRHs. As shown in FIG. 5, UE1 receives control and data signaling from the RRH1 520a, UE5 receives control and data signaling from RRH2 520b, UE2, UE4, and UE7 receive both control and data signaling from the eNB1 510. However, UE3 receives control signaling from the macro base station 510 while receiving data signaling from the RRH4 520d.

Traditionally, a shared channel, such as PDSCH, is associated with the physical cell ID (PCI) of the transmitting cell. For example, the scrambling sequence for the shared channel may be initialized with a seed based on the physical cell ID of the transmitting cell. For various CoMP scenarios, the shared channel may be transmitted using a virtual cell ID. For example, the scrambling sequence for the shared channel and the control channel in a cell can be initialized with a seed based on a virtual cell ID. The virtual cell ID may or may not be the same as the cell ID. The virtual cell ID may be specified for CoMP and MIMO operation, such as dynamic point(s) switch, decoupled control and data, multi-user MIMO (MU-MIMO) in a cell.

In some cases, when a shared channel is served by a first cell (e.g., cell 522b) rather than by a second cell (e.g., cell 512), the corresponding control channel is also transmitted from the first cell (e.g., cell 522b). Furthermore, in some cases, the control transmissions and data transmissions may be split between cells. For example, in heterogeneous networks, cell offloading is one reason for serving the shared channel from the first cell (e.g., cell 522b) instead of serving the shared channel from the second cell (e.g., cell 512). Specifically, although the second cell may have the strongest reference signal received power (RSRP), the shared channel is offloaded to the first cell due to cell offloading. Same cell offloading may also apply to control channels. Control and data from different cells implies that the reception timing for control and data may be misaligned, still, the misalignment may be mitigated by aligning the timing of the control and data channel transmissions.

The acknowledgement/negative acknowledgement (ACK/NAK) resources for downlink transmissions are a function of legacy control channels and in one aspect may also be a function of enhanced control channels. For example, in one configuration, the control and data channel from the same cell(s) facilitate ACK/NAK resource management on the same cell.

Moreover, in some configurations, the control and data transmissions may be split for improved power control of the enhanced control channel in comparison to the power control of the legacy control channel (which may experience interference from the shared channel). The splitting of the control and data transmission may also improve the precoding operation(s) for the enhanced control channel.

One aspect of the present disclosure is directed to enabling enhanced control channel, such as ePDCCH, switching along with shared channel, such as PDSCH, switching. As described above, the control channel may be associated with the physical cell ID of the transmitting cell. Both the scrambling sequence and permutation of resource mapping are functions of the physical cell ID of the transmitting cell.

In particular, in one configuration, the eNodeB transmits the enhanced control channel from a first cell having a first physical cell ID, such as cell 522b, where the enhanced control channel is scrambled based on a second physical cell ID of a second cell. The first physical cell ID is not the same as the second physical cell ID. The enhanced control channel is demodulated by the UE reference signal (RS). The scrambling sequence is also based on the second physical cell ID. The first cell transmits the enhanced control channel using one of the enhanced control channel decoding candidates configured by the second physical cell ID. That is, the region associated with the enhanced control channel is defined by the second physical cell ID.

Additionally, the enhanced control channel may be orthogonalized with other channels in the first cell in a frequency division multiplexed (FDM) manner. Further, the enhanced control channel may be multiplexed with other channels in the first cell in the same resource block when there is no significant performance degradation.

In another aspect of the present disclosure, virtual cell ID(s) (e.g., virtual physical cell ID(s)) may be defined for an enhanced control channel, such as ePDCCH. In one aspect, the set of virtual cell ID(s) for the enhanced control channel is the same as the set of virtual cell ID(s) for the shared channel. Alternately, the set of virtual cell ID (s) for the enhanced control channel may be separately configured from the set of virtual cell ID (s) for the shared channel. When the set of virtual cell ID(s) for the enhanced control channel is separately configured, a UE is signaled the set of virtual cell ID(s) for the enhanced control channel. The signaling of the set of virtual cell ID(s) may be separate from other signaling. In one example, the virtual cell ID(s) are signaled to the UE via radio resource control (RRC) signaling. The virtual cell ID in use is applicable to the enhanced control channel transmission and also the reference signals associated with the enhanced control channel transmission.

In one configuration, more than one virtual cell ID may be defined for the enhanced control channel of the UE. When there is more than one virtual cell ID defined, the UE has to look for the enhanced control channel based on the multiple virtual cell IDs. In other words, the maximum number of blind decodes increases when other conditions remain the same.

In one configuration, the maximum number of blind decodes may be maintained by splitting the decoding candidates, aggregation levels, search space, and/or time resources, among the cells (and virtual cell IDs). That is decoding candidates, aggregation levels, etc., can be assigned to different virtual cell IDs.

For example, if the number of decoding candidates is originally K, and the number of virtual cell IDs is two, the decoding candidates for the two virtual cell IDs can be K1 and K2, respectively, such that K1+K2=K. According to the present example, in one configuration, the K1 decoding candidates can be associated with the first virtual cell ID in a subframe and the K2 decoding candidates can be associated with the second virtual cell ID in the same subframe. According to the present example, in another configuration, the decoding candidates for the two virtual cell IDs can be K for the first virtual cell ID in odd subframes, and K for the second virtual cell ID in even subframes. In one configuration, the split is signaled to the UE via RRC signaling. K1 may have the same number of decoding candidates as K2 or the number of decoding candidates may be different. In another configuration, a cell may transmit the correspondence between a set of decoding candidates and a virtual cell ID to the UE.

In one configuration, a UE may be configured with two or more enhanced control channel resource sets, and the enhanced control channel decoding candidates for a UE can be split among the two or more enhanced control channel resource sets. The maximum number of blind decodes may be maintained by associating each enhanced control channel resource set with a virtual cell ID.

In another aspect, each physical resource block (PRB) pair that the UE monitors for the enhanced control channel may be associated with a virtual cell ID, such that the maximum number of blind decodes does not increase. In this case, a particular enhanced control channel decoding candidate may be associated with two or more virtual cell IDs if the decoding candidate spans two or more physical resource block pairs.

A different resource granularity for virtual cell ID association is also possible. As an example, each enhanced control channel element (eCCE) pair that the UE monitors for the enhanced control channel may be associated with a virtual cell ID. As another example, each precoding resource block group (PRG) may be associated with a virtual cell ID.

An enhanced control channel element (eCCE) may have two modes. In a localized mode, the cell transmitting enhanced control channel elements for a UE is the same as the cell transmitting the legacy control channel. In this case, the UE may be configured to monitor both the legacy control channel and enhanced control channel. The localized mode facilitates the exploitation of beam forming gain. In a distributed mode, the cell may transmit the enhanced control channel using distribution resources for improved frequency diversity. The localized mode is more power efficient because the legacy control channel cell is likely received by the UE with the largest reference signal received power (RSRP). Accordingly, the enhanced control channel transmission cell may be further dependent on the enhanced control channel mode. In one configuration, each mode may be associated with a separate virtual cell ID, such that the maximum number of blind decodes does not increase.

In another configuration, one enhanced control channel may be transmitted from two or more cells. For example in a downlink CoMP configuration, the enhanced control channel may be transmitted from multiple cells. For example, the enhanced control channel may be transmitted from multiple cells when the shared channel is transmitted from two or more cells.

Figure 6:
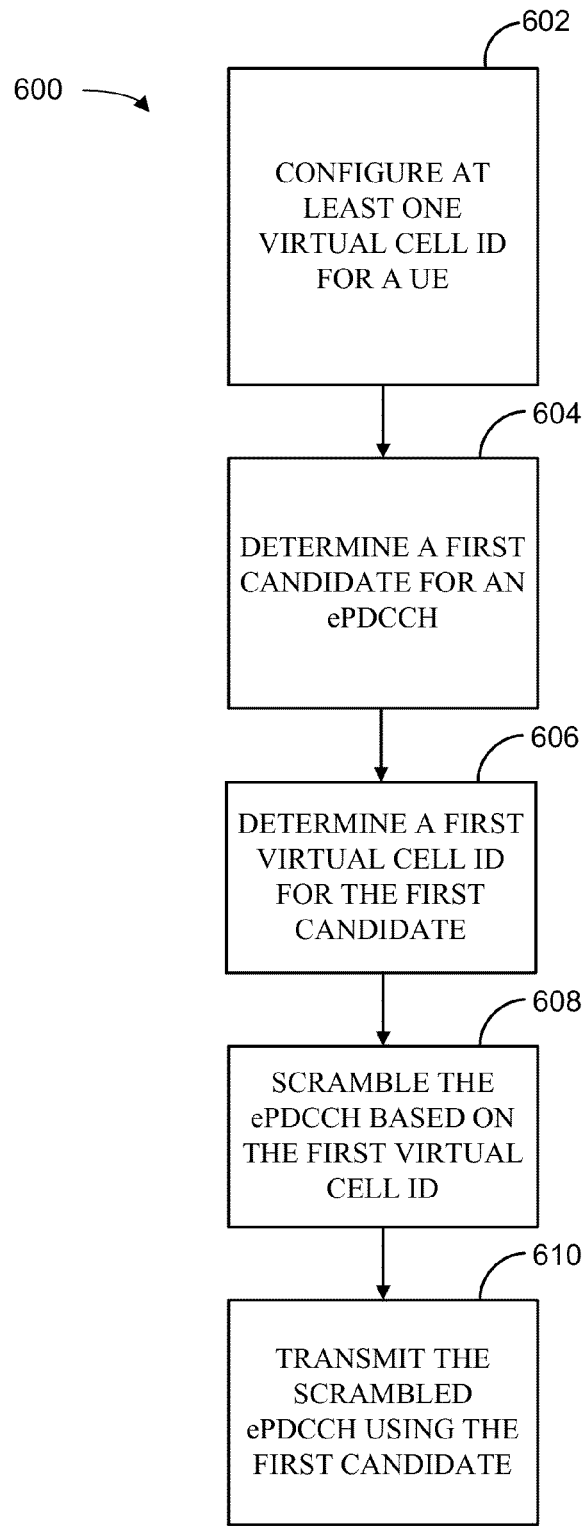
FIG. 6 is a block diagram illustrating a method for processing ePDCCH, according to an aspect of the present disclosure.

FIG. 6 illustrates a method 600 for processing ePDDCH in a network. In block 602, an eNodeB configures at least one virtual cell ID for a UE. In block 604, the eNodeB determines a first candidate for an ePDCCH. Furthermore, in block 606, the eNodeB determines a first virtual cell ID for the first candidate. Additionally, in block 608, the eNodeB scrambles the ePDCCH based on the first virtual cell ID. Finally, in block 610, the eNodeB transmits the scrambled ePDCCH using the first candidate. The scrambled ePDCCH is transmitted to a UE.

Figure 7:
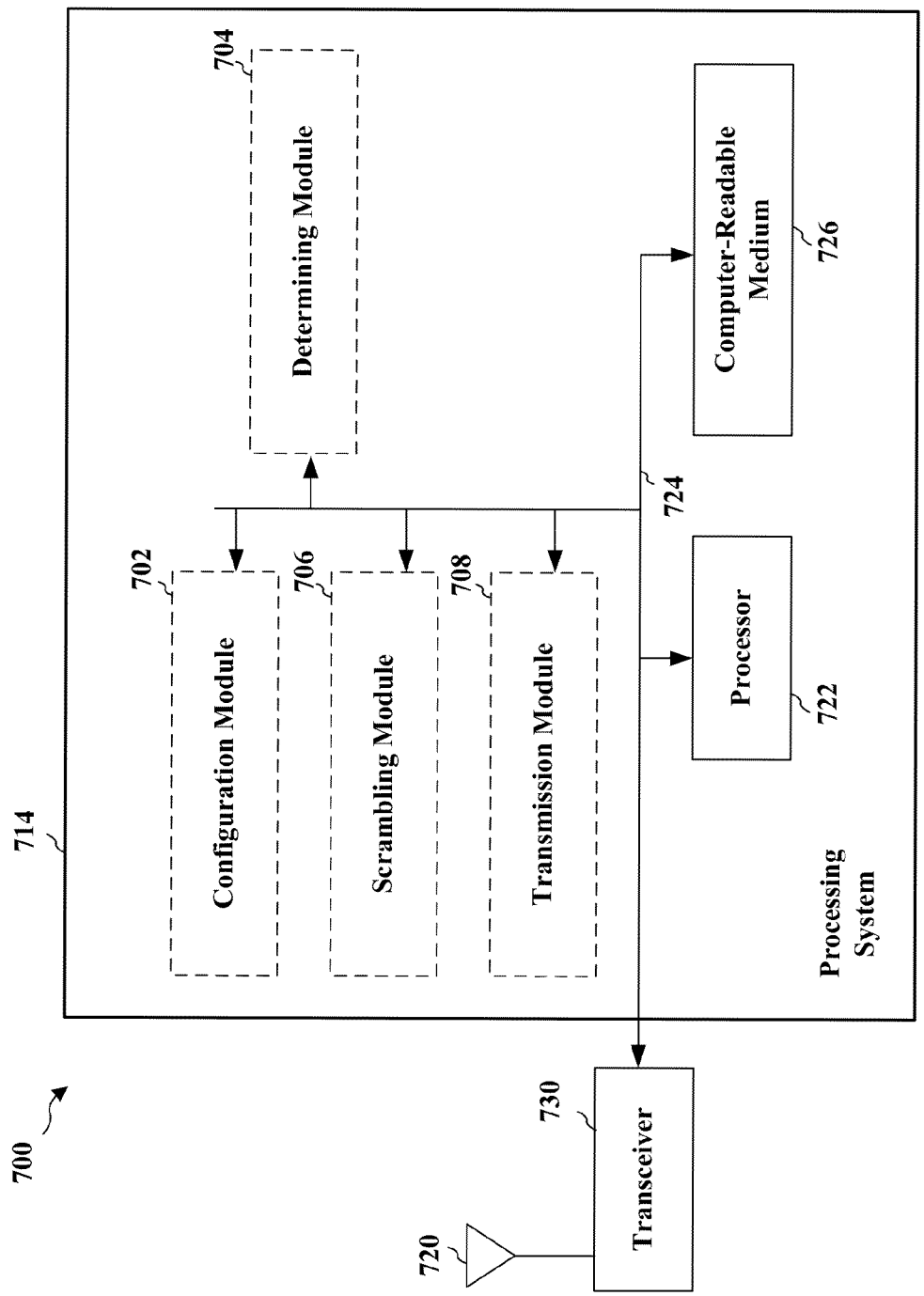
FIG. 7 is a block diagram illustrating different components in an exemplary apparatus.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 the modules 702, 704, 706 and the computer-readable medium 726. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other apparatus over a transmission medium. The processing system 714 includes a processor 722 coupled to a computer-readable medium 726. The processor 722 is responsible for general processing, including the execution of software stored on the computer-readable medium 726. The software, when executed by the processor 722, causes the processing system 714 to perform the various functions described for any particular apparatus. The computer-readable medium 726 may also be used for storing data that is manipulated by the processor 722 when executing software.

The processing system 714 includes a configuration module 702 for configuring at least one virtual cell ID for a UE. The processing system 714 also includes a determining module 704 for determining a first candidate for an ePDCCH. The determining module 704 may also determine a first virtual cell ID for the first candidate. The processing system 714 may still further include a scrambling module 706 for scrambling the ePDCCH based on the first virtual cell ID. The processing system 714 may still further include a transmission module 708 for transmitting the scrambled first ePDCCH to the UE. The modules may be software modules running in the processor 722, resident/stored in the computer-readable medium 726, one or more hardware modules coupled to the processor 722, or some combination thereof. The processing system 714 may be a component of the eNodeB 110 and may include the memory 442, and/or the controller/processor 440.

In one configuration, the eNodeB 110 is configured for wireless communication including means for scrambling, means for determining, and a means for configuring. In one aspect, the scrambling means and/or configuring means may be the controller/processor 440, memory 442, configuration module 702, determining module 704, and/or scrambling module 706 configured to perform the functions recited by the scrambling means, determining means, and/or configuring means. The eNodeB 110 is also configured to include a means for transmitting. In one aspect, the transmitting means may be the controller/processor 440, memory 442, transmit processor 420, modulators 432a-t, antenna 434a-t, and/or transmission module 708 configured to perform the functions recited by the transmitting means. In another aspect, the aforementioned means may be a module or any apparatus configured to perform the functions recited by the aforementioned means.

In one configuration, the UE 120 is configured for wireless communication including means for determining and means for decoding. In one aspect, the determining means and/or decoding means may be the controller/processor 480, memory 482, demodulators 454, and receive processor 458 configured to perform the functions recited by the determining means and/or decoding means. In another aspect, the aforementioned means may be a module or any apparatus Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
configuring at least one virtual cell identifier (ID) for an enhanced physical downlink control channel (ePDCCH) to be transmitted to a user equipment (UE), each virtual cell ID being separately configured from a physical cell ID of a serving cell, and the ePDDCCH being associated with at least one ePDCCH resource set of a plurality of ePDCCH resource sets configured for the UE;
determining a first ePDCCH decoding candidate from a plurality of ePDCCH decoding candidates used by the UE to attempt to decode the ePDCCH in a first search space;

determining a first virtual cell ID for the first ePDCCH decoding candidate, the first virtual cell ID being associated with the at least one ePDCCH resource set of the plurality of ePDCCH resource sets configured for the UE;
scrambling the ePDCCH with a scrambling sequence that is based at least in part on the first virtual cell ID; and
transmitting, to the UE, the scrambled ePDCCH using the first ePDCCH decoding candidate.

2. The method of claim 1, further comprising frequency division multiplexing the ePDCCH with other channels.

3. The method of claim 1, in which the configuring comprises configuring the at least one virtual cell ID to be the same as at least one virtual cell ID of a physical downlink shared channel (PDSCH).

4. The method of claim 1, in which the configuring comprises configuring the at least one virtual cell ID separately from at least one virtual cell ID of a physical downlink shared channel (PDSCH).

5. The method of claim 1, further comprising signaling the at least one configured virtual cell ID to the UE.

6. The method of claim 1, further comprising associating the first virtual cell ID with transmitted reference signals.

7. The method of claim 1, further comprising:
determining a second ePDCCH decoding candidate for the UE to attempt to decode the ePDCCH in a second search space;
determining a second virtual cell ID for the second ePDCCH decoding candidate when a plurality of virtual cell IDs are configured for the UE;
scrambling the ePDCCH with a scrambling sequence that is based at least in part on the second virtual cell ID; and
transmitting the scrambled ePDCCH using the second ePDCCH decoding candidate.

8. The method of claim 7, further comprising associating the first ePDCCH decoding candidate with a localized ePDCCH transmission and the second ePDCCH decoding candidate with a distributed ePDCCH transmission.

9. The method of claim 7, further comprising associating the first ePDCCH decoding candidate with a first ePDCCH resource set and the second ePDCCH decoding candidate with a second ePDCCH resource set.

10. The method of claim 7, in which the first ePDCCH decoding candidate is transmitted from a first cell and the second ePDCCH decoding candidate is transmitted from a second cell.

11. The method of claim 1, further comprising:
configuring a plurality of ePDCCH resource sets.

12. The method of claim 1, in which the scrambled first ePDCCH is transmitted from a plurality of cells.

13. A method of wireless communication, comprising:
determining, at a user equipment (UE), a first set of enhanced physical downlink control channel (ePDCCH) decoding candidates to attempt to decode an ePDCCH in a first search space, the ePDDCCH being associated with at least one ePDCCH resource set of a plurality of ePDCCH resource sets configured for the UE;
determining, at the UE, a first virtual cell identifier (ID) for the first set of ePDCCH decoding candidates, the first virtual cell ID being separately configured from a physical cell ID of a serving cell, and the first virtual cell ID being associated with the at least one ePDCCH resource set of the plurality of ePDCCH resource sets configured for the UE; and
decoding, at the UE, the ePDCCH based at least in part on the first virtual cell ID and the determined first set of ePDCCH decoding candidates.

14. The method of claim 13, in which the ePDCCH is scrambled based at least in part on the first virtual cell ID.

15. The method of claim 13, in which the first virtual cell ID is the same as at least one virtual cell ID of a physical downlink shared channel (PDSCH).

16. The method of claim 13, in which the first virtual cell ID is different from at least one virtual cell ID of a physical downlink shared channel (PDSCH).

17. The method of claim 13, further comprising:
determining a second set of ePDCCH decoding candidates to attempt to decode the ePDCCH in a second search space;
determining a second virtual cell ID for the second set of decoding candidates; and
decoding the ePDCCH based at least in part on the second virtual cell ID and the determined second set of ePDCCH decoding candidates.

18. The method of claim 17, in which the ePDCCH of the first set of ePDCCH decoding candidates is a localized ePDCCH transmission and the ePDCCH of the second set of ePDCCH decoding candidates is a distributed ePDCCH transmission.

19. The method of claim 17, in which the ePDCCH of the first set of ePDCCH decoding candidates is received from a first cell and the ePDCCH of the second set of ePDCCH decoding candidates is received from a second cell.

20. The method of claim 13, in which the ePDCCH is scrambled by the first virtual cell ID.

21. The method of claim 17, further comprising associating the first set of ePDCCH decoding candidates with a first ePDCCH resource set and the second set of ePDCCH decoding candidates with a second ePDCCH resource set.

22. The method of claim 13, in which the ePDCCH is received from a plurality of cells.

23. The method of claim 13, further comprising:
receiving a configuration of a plurality of ePDCCH resource sets.

24. The method of claim 13, further comprising:
receiving at least one configured virtual cell ID; and
determining the first virtual cell ID based at least in part on the received at least one configured virtual cell ID.

25. An apparatus for wireless communications, comprising:
means for configuring at least one virtual cell identifier (ID) for an enhanced physical downlink control channel (ePDCCH) to be transmitted to a user equipment (UE), each virtual cell ID being separately configured from a physical cell ID of a serving cell, and the ePDDCCH being associated with at least one ePDCCH resource set of a plurality of ePDCCH resource sets configured for the UE;
means for determining a first ePDCCH decoding candidate from a plurality of ePDCCH decoding candidates used by the UE to attempt to decode the ePDCCH in a first search space;
means for determining a first virtual cell ID for the first ePDCCH decoding candidate, the first virtual cell ID being associated with the at least one ePDCCH resource set of the plurality of ePDCCH resource sets configured for the UE;
means for scrambling the ePDCCH with a scrambling sequence that is based at least in part on the first virtual cell ID; and
means for transmitting, to the UE, the scrambled ePDCCH using the first ePDCCH decoding candidate.

26. An apparatus for wireless communications, comprising:

means for determining, at a user equipment (UE), a first set of enhanced physical downlink control channel (ePDCCH) decoding candidates to attempt to decode an ePDCCH in a first search space, the ePDDCCH being associated with at least one ePDCCH resource set of a plurality of ePDCCH resource sets configured for the UE;

means for determining, at the UE, a first virtual cell identifier (ID) for the first set of ePDCCH decoding candidates, the first virtual cell ID being separately configured from a physical cell ID of a serving cell, and the first virtual cell ID being associated with the at least one ePDCCH resource set of the plurality of ePDCCH resource sets configured for the UE; and means for decoding the ePDCCH based at least in part on the first virtual cell ID and the determined first set of decoding candidates.

27. A computer program product for wireless communications, the computer program product comprising:

a non-transitory computer-readable medium having program code recorded thereon, the program code comprising:

program code to configure at least one virtual cell identifier (ID) for an enhanced physical downlink control channel (ePDCCH) to be transmitted to a user equipment (UE), each virtual cell ID being separately configured from the physical cell ID of the serving cell, and the ePDDCCH being associated with at least one ePDCCH resource set of a plurality of ePDCCH resource sets configured for the UE;

program code to determine a first ePDCCH decoding candidate from a plurality of ePDCCH decoding candidates used by the UE to attempt to decode the ePDCCH in a first search space;

program code to determine a first virtual cell ID for the first ePDCCH decoding candidate, the first virtual cell ID being associated with the at least one ePDCCH resource set of the plurality of ePDCCH resource sets configured for the UE;

program code to scramble the ePDCCH with a scrambling sequence that is based at least in part on the first virtual cell ID; and program code to transmit, to the UE, the scrambled ePDCCH using the first ePDCCH decoding candidate.

28. A computer program product for wireless communications, the computer program product comprising:

a non-transitory computer-readable medium having program code recorded thereon, the program code comprising:

program code to determine, at a user equipment (UE), a first set of enhanced physical downlink control channel (ePDCCH) decoding candidates to attempt to decode an ePDCCH in a first search space, the ePDDCCH being associated with at least one ePDCCH resource set of a plurality of ePDCCH resource sets configured for the UE;

program code to determine, at the UE, a first virtual cell identifier (ID) for the first set of ePDCCH decoding candidates, the first virtual cell ID being separately configured from a physical cell ID of a serving cell, and the first virtual cell ID being associated with the at least one ePDCCH resource set of the plurality of ePDCCH resource sets configured for the UE; and program code to decode the ePDCCH based at least in part on the first virtual cell ID and the determined first set of decoding candidates.

29. An apparatus for wireless communications, comprising:

a memory; and at least one processor coupled to the memory, the at least one processor being configured:

to configure at least one virtual cell identifier (ID) for an enhanced physical downlink control channel (ePDCCH) to be transmitted to a user equipment (UE), each virtual cell ID being separately configured from a physical cell ID of a serving cell, and the ePDDCCH being associated with at least one ePDCCH resource set of a plurality of ePDCCH resource sets configured for the UE;

to determine a first ePDCCH decoding candidate from a plurality of ePDCCH decoding candidates used by the UE to attempt to decode the ePDCCH in a first search space;

to determine a first virtual cell ID for the first ePDCCH decoding candidate;

to scramble the ePDCCH with a scrambling sequence that is based at least in part on the first virtual cell ID, the first virtual cell ID being associated with the at least one ePDCCH resource set of the plurality of ePDCCH resource sets configured for the UE; and to transmit, to the UE, the scrambled ePDCCH using the first ePDCCH decoding candidate.

30. The apparatus of claim 29, in which the at least one processor is further configured to frequency division multiplex the ePDCCH with other channels.

31. The apparatus of claim 29, in which the at least one processor is further configured to configure the at least one virtual cell ID to be the same as at least one virtual cell ID of a physical downlink shared channel (PDSCH).

32. The apparatus of claim 29, in which the at least one processor is further configured to configure the at least one virtual cell ID separately from at least one virtual cell ID of a physical downlink shared channel (PDSCH).

33. The apparatus of claim 29, in which the at least one processor is further configured to signal the at least one configured virtual cell ID to the UE.

34. The apparatus of claim 29, in which the at least one processor is further configured to associate the first virtual cell ID with transmitted reference signals.

35. The apparatus of claim 29, in which the at least one processor is further configured:

to determine a second ePDCCH decoding candidate for the UE to attempt to decode the ePDCCH in a second search space;

to determine a second virtual cell ID for the second ePDCCH decoding candidate when a plurality of virtual cell IDs are configured for the UE;

to scramble the ePDCCH with a scrambling sequence that is based at least in part on the second virtual cell ID; and to transmit the scrambled ePDCCH using the second ePDCCH decoding candidate.

36. The apparatus of claim 35, in which the at least one processor is further configured:

to associate the first ePDCCH decoding candidate with a localized ePDCCH transmission; and to associate the second ePDCCH decoding candidate with a distributed ePDCCH transmission.

37. The apparatus of claim 35, in which the at least one processor is further configured:

to associate the first ePDCCH decoding candidate with a first ePDCCH resource set and to associate the second ePDCCH decoding candidate with a second ePDCCH resource set.

38. The apparatus of claim 35, in which the first ePDCCH decoding candidate is transmitted from a first cell and the second ePDCCH decoding candidate is transmitted from a second cell.

39. The apparatus of claim 29, in which the at least one processor is further configured:
to configure a plurality of ePDCCH resource sets.

40. The apparatus of claim 29, in which the scrambled first ePDCCH is transmitted from a plurality of cells.

41. A user equipment (UE) configured for wireless communications, the UE comprising:
a memory; and
at least one processor coupled to the memory, the at least one processor being configured:
to determine a first set of enhanced physical downlink control channel (ePDCCH) decoding candidates to attempt to decode an ePDCCH in a first search space, the ePDDCCH being associated with at least one ePDCCH resource set of a plurality of ePDCCH resource sets configured for the UE;
to determine a first virtual cell identifier (ID) for the first set of ePDCCH decoding candidates, the first virtual cell ID being separately configured from a physical cell ID of a serving cell, and the first virtual cell ID being associated with the at least one ePDCCH resource set of the plurality of ePDCCH resource sets configured for the UE; and
to decode the ePDCCH based at least in part on the first virtual cell ID and the determined first set of decoding candidates.

42. The UE of claim 41, in which the ePDCCH is scrambled by the first virtual cell ID.

43. The UE of claim 41, in which the first virtual cell ID is the same as at least one virtual cell ID of a physical downlink shared channel (PDSCH).

44. The UE of claim 41, in which the first virtual cell ID is different from at least one virtual cell ID of a physical downlink shared channel (PDSCH).

45. The UE of claim 41, in which the at least one processor is further configured:
to determine a second set of ePDCCH decoding candidates to attempt to decode the ePDCCH in a second search space;
to determine a second virtual cell ID for the second set of decoding candidates; and
to decode the ePDCCH based at least in part on the second virtual cell ID and the determined second set of decoding candidates.

46. The UE of claim 45, in which the ePDCCH of the first set of ePDCCH decoding candidates is a localized ePDCCH transmission and the ePDCCH of the second set of ePDCCH decoding candidates is a distributed ePDCCH transmission.

47. The UE of claim 45, in which the ePDCCH of the first set of ePDCCH decoding candidates is received from a first cell and the ePDCCH of the second set of ePDCCH decoding candidates is received from a second cell.

48. The UE of claim 45, in which the ePDCCH is scrambled by the second virtual cell ID.

49. The UE of claim 45, in which the at least one processor is further configured to associate the first set of ePDCCH decoding candidates with a first ePDCCH resource set and the second set of ePDCCH decoding candidates with a second ePDCCH resource set.

50. The UE of claim 41, in which the ePDCCH is received from a plurality of cells.

51. The UE of claim 41, in which the at least one processor is further configured:
to receive a configuration of a plurality of ePDCCH resource sets.

52. The UE of claim 41, in which the at least one processor is further configured:
to receive at least one configured virtual cell ID; and
to determine the first virtual cell ID based at least in part on the received at least one configured virtual cell ID.

* * * * *